(12) United States Patent
Takeuchi et al.

(10) Patent No.: US 7,009,824 B2
(45) Date of Patent: Mar. 7, 2006

(54) ELECTRICALLY-OPERATED ACTUATOR SYSTEM

(75) Inventors: Tokuhisa Takeuchi, Chita-gun (JP); Takashi Takata, Nagoya (JP)

(73) Assignee: DENSO Corporation, Kariya (JP)

( * ) Notice: Subject to any disclaimer, the term of this patent is extended or adjusted under 35 U.S.C. 154(b) by 378 days.

(21) Appl. No.: 10/600,218

(22) Filed: Jun. 20, 2003

(65) Prior Publication Data

US 2004/0004457 A1 Jan. 8, 2004

(30) Foreign Application Priority Data

Jun. 25, 2002 (JP) ............................. 2002-184951

(51) Int. Cl.
*H02H 5/04* (2006.01)
(52) U.S. Cl. ......................................... 361/23; 318/685
(58) Field of Classification Search .................... None
See application file for complete search history.

(56) References Cited

U.S. PATENT DOCUMENTS

| 5,031,715 A | * | 7/1991 | Ogawa et al. ............... 180/179 |
| 5,939,853 A | * | 8/1999 | Masauji et al. ............. 318/685 |
| 6,501,239 B1 | * | 12/2002 | Ito et al. ........................ 318/34 |
| 6,747,432 B1 | * | 6/2004 | Yoshimura ................... 318/599 |
| 6,771,178 B1 | * | 8/2004 | Bruzy et al. ................. 340/648 |
| 6,917,178 B1 | * | 7/2005 | Takeuchi et al. ............. 318/625 |
| 2004/0124797 A1 | * | 7/2004 | Takeuchi et al. ............. 318/466 |

FOREIGN PATENT DOCUMENTS

JP  11-342724  12/1999

* cited by examiner

*Primary Examiner*—Ronald Leja
(74) *Attorney, Agent, or Firm*—Harness, Dickey & Pierce, PLC

(57) ABSTRACT

An actuator, operated by being supplied with electric power, needs an initial setting for performing a desired operation by recognizing its starting position. The initial setting is conducted when an abnormality occurs in a signal which represents an operation of the actuator. The initial setting is also conducted when a system for the actuator recognizes a fact that a battery is electrically disconnected in association with information denoting a condition of the battery in a memory.

13 Claims, 12 Drawing Sheets

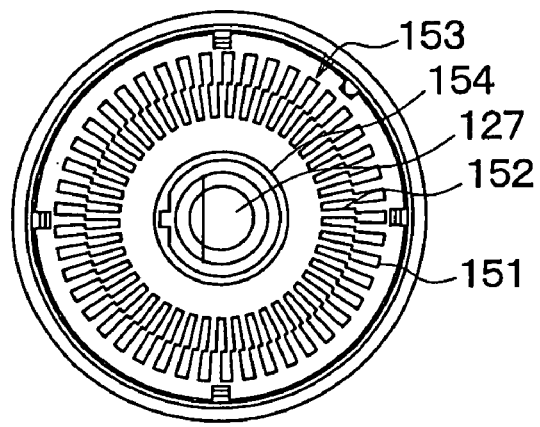
FIG. 4A
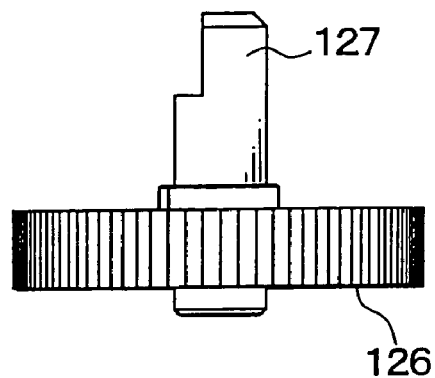
FIG. 4B
FIG. 5
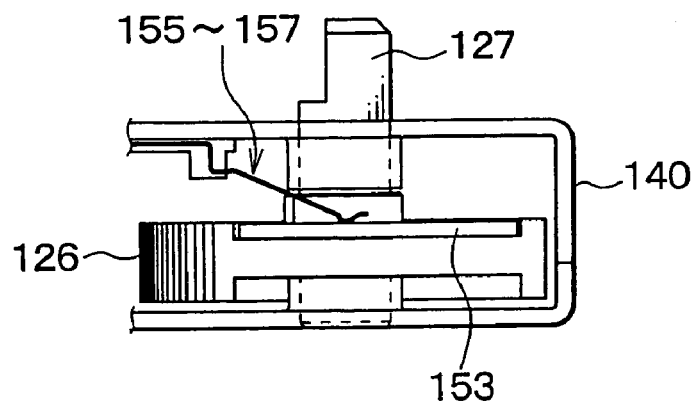

ELECTRICALLY-OPERATED ACTUATOR SYSTEM

CROSS REFERENCE TO RELATED APPLICATION

This application is based upon Japanese Patent Application No. 2002-184951, filed on Jun. 25, 2002, the contents of which are incorporated herein by reference.

BACKGROUND OF THE INVENTION

1. Field of the Invention

The present invention relates to an electrically-operated actuator system such as the one capable of activating a movable member such as an air mix door, a mode switching door in a vehicle air conditioner, or the like.

2. Related Art

As disclosed in JP-A-H11-342724, an electrically-operated actuator is operated to an operational limit, for example, a mechanical motion-limiting member such as a stop to recognize a position thereof at the operational limit as a starting point for motion of the actuator. The operational angle of the actuator is controlled by using the starting point. Hereinafter, an operation in which the actuator is activated until it is stopped by the stop is referred to as an initialization.

However, the initialization is conducted whenever the actuator described in the above-described Japanese publication comes close to the starting point, so that the impact force is applied frequently to the electrically-operated actuator and the stop.

Therefore, the mechanical strength should be increased in both of them. This results in the growth in size of both of them and the rise in their manufacturing initial cost.

By the way, there is tendency that the number of vehicles has increased these days, which control electric power supply from a battery in the vehicle to electrical apparatuses in the vehicle and stop supplying electric power to them when a predetermined time has elapsed after the ignition switch was turned off, that is, while the vehicle is stopped or parked and the ignition switch is turned off, to reduce the consumption of dark current which flows in the electrical apparatuses.

Meanwhile, the electric actuator, which has a memory, also receives electrical supply from the battery, for memorizing the information regarding the starting point. The actuator will perform the initialization after power has been turned off because the information regarding the starting point is volatile or erased when the electric supply is stopped.

Therefore, the initializing process will be performed whenever the ignition switch is turned on, in a case when the battery is disconnected as well as in a case when the predetermined time has elapsed after the ignition switch is turned off because the information regarding the starting point is erased whenever the predetermined time has passed after the ignition switch is turned off because of the stop of power supply.

Consequently, the impact force will frequently be applied to the stop and the electrical actuator, and therefore, it is necessary to increase the strength of them which thereby increases the initial cost and need to make their size bigger.

SUMMARY OF THE INVENTION

An object of the invention is to provide an improved electrically-operated actuator.

According to an aspect of the present invention, an electrically-operated actuator has rotation angle detecting means, starting point setting means, and starting point resetting means which reset the starting point with an indication from the rotation angle detecting means.

With this feature, the starting point is reset in association with the determination in the rotation angle detecting means. Therefore, the number of operations for setting the starting point can be reduced.

Preferably, the indication from the rotation angle detecting means is based on an abnormality in signal in association with a rotation angle of an electrically-operated motor.

Other features and advantages of the present invention will become more apparent from the following detailed description made with reference to the accompanying drawings.

BRIEF DESCRIPTION OF THE DRAWINGS

FIG. 4A is a plan view of a pulse plate in the electrically-operated actuator in the first embodiment of the present invention;

FIG. 4B is a side view of the pulse plate in the electrically-operated actuator in the first embodiment of the present invention;

FIG. 5 is a cross sectional view of the electrically-operated actuator in the first embodiment of the present invention taken along line V—V in FIG. 3;

DETAILED DESCRIPTION OF THE PREFERRED EMBODIMENT

Figure 1:
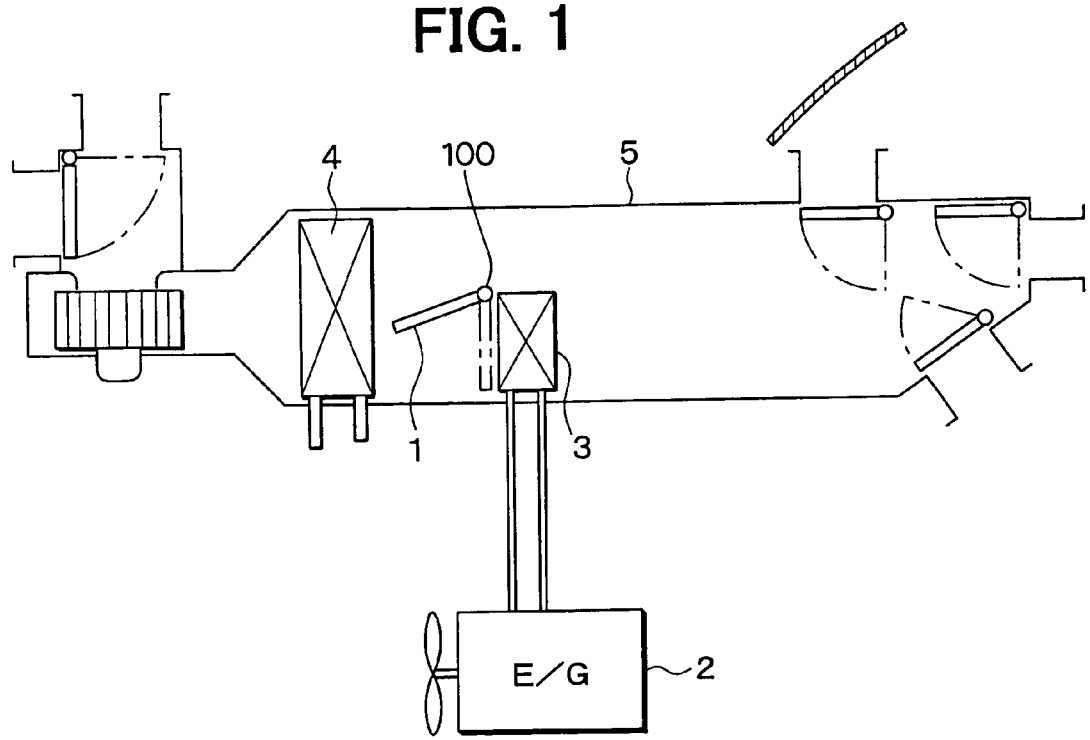
FIG. 1 is a system diagram illustrating a construction of a ventilation system of the present invention.

Specific embodiments of the present invention will now be described hereinafter with reference to the accompanying drawings in which the same or similar component parts are designated by the same or similar reference numerals.

(First Embodiment)

First, an electrically-operated actuator (hereinafter, referred to as an actuator) is applied to a driving apparatus for an air mix door in a vehicle ventilation system. An air mix door 1 is a component to adjust the temperature of the air blown into a passenger compartment by adjusting the amount of the air bypassing a heater core 3, which heats the air blown into the passenger compartment by using the cooling water for an engine 2 as a heat source, in the vehicle ventilation system shown in FIG. 1.

A casing 5, which is made of plastic, contains a heat exchanger including the heater core 3 and an evaporator 4, and the air mix door 1 and the like. An actuator 100 (FIG. 2) is fixed to the casing 5 with fixing means such as a screw.

Next, the actuator will be described with reference to FIGS. 2 and 3. As shown in FIG. 3, a direct current motor 110 rotates by being powered with electricity from a battery mounted in a vehicle (not shown). A speed reduction mechanism 120 is a change gear mechanism for transmitting a rotary power from the motor 11 to the air mix door 1 by reducing its rotational speed. A portion including the motor 110 and the speed reduction mechanism 120 is referred to as a driving portion 130.

The speed reduction mechanism 120 is an array of gearing including a worm gear 121 which is press-fitted to an output shaft of the motor 110, a gear 122 engaged with the worm gear 121, and spur gears 123, 124 and 125. A final-stage gear 126 positioned at an output side is provided with an output shaft 127.

Figure 6:
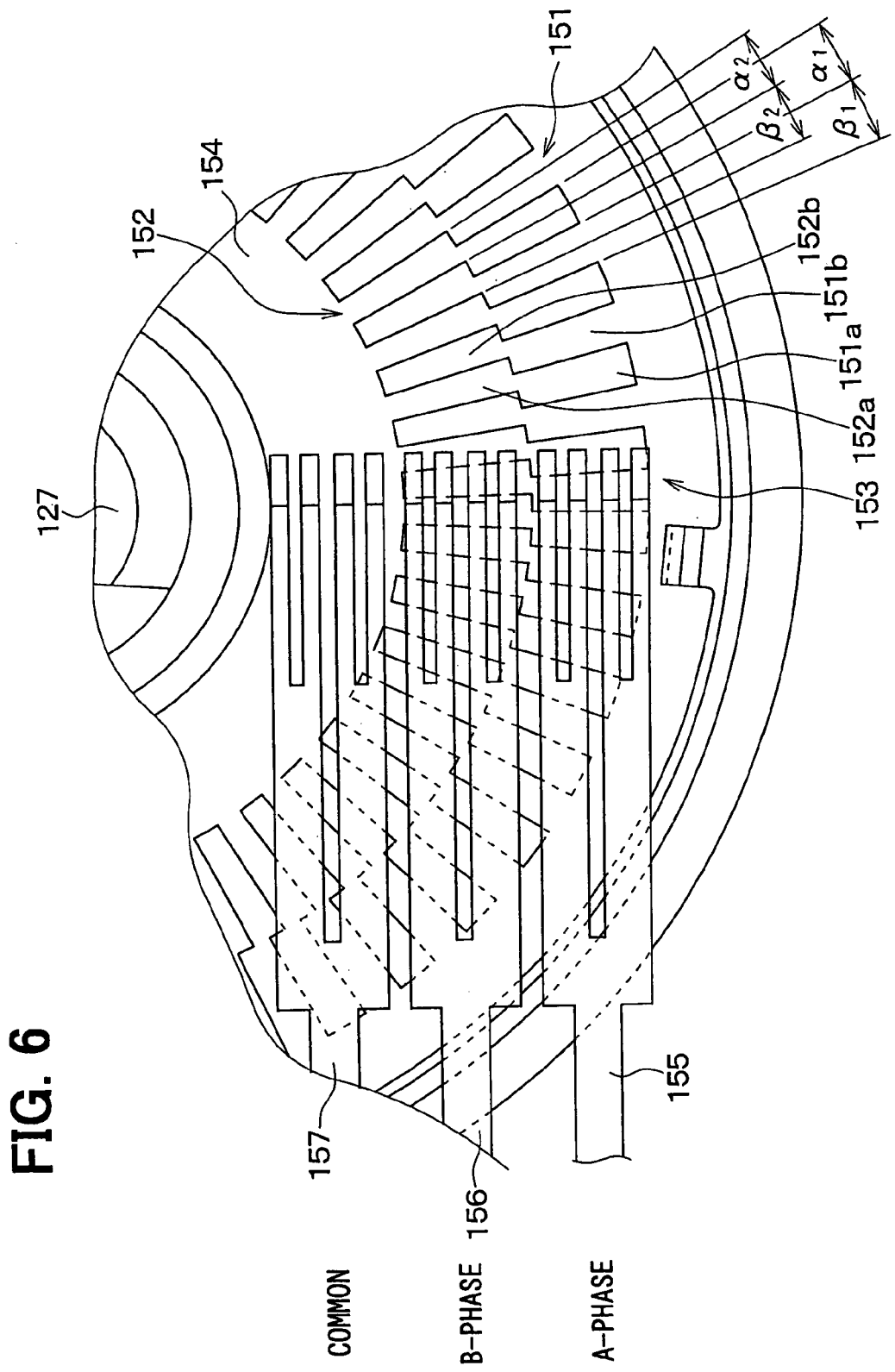
FIG. 6 is an enlarged plan view of the pulse plate of the electrically-operated actuator in the first embodiment of the present invention.

A casing 140, which is made of plastic, is equipped with brushes 155–157 (FIGS. 5, 6), and includes the driving portion 130.

As shown in FIGS. 3–6 (especially, FIG. 6), a pulse pattern plate 153 (hereinafter referred to as a pattern plate) is provided on an output side (output shaft 127) as compared to an input gear (gear 122) which is driven directly by the direct current motor 110 so as to rotate with the output shaft 127. The pattern plate 153 is provided with a first pulse pattern 151 having conductive portions 151a and 152a and a second pulse pattern 152 having non-conductive portions 151b and 152b to make an alternate arranged pattern in a circumferential direction.

Circumferential angles α1 and α2 of the conductive portions 151a and 152a are made equal to circumferential angles β1 and β2 of the non-conductive portions 151b and 152b, respectively. Also, a phase of the first pulse pattern 151 is shifted about a half of the circumferential angles α1 and α2 (equal to the circumferential angles β1 and β2) with respect to the second pulse pattern 152.

The first and second pulse patterns 151 and 152 are electrically connected with each other. Both patterns 151, 152 are electrically connected to a common pattern (common conductive pattern) 154 provided inside with respect to both patterns. Then, they are electrically connected to a negative terminal of the battery through the brush 157 described below.

Whereas first, second and third brushes (electrical contacts) 155–157, which are made of a conductive material based on copper, integrated in one unit by resin molding, and provided at a positive terminal side of the battery, are attached to the casing 140 by assembling. The first brush 155 contacts the first pulse pattern 151, the second brush 156 contacts the second pulse pattern 152, and the third brush 157 contacts the common pattern 154.

The number of contacts between each of the first, second and third brushes 155, 156 and 157 and the pattern plate 153 is equal to 2 or more (actually, 4 contacts in this embodiment), so that an electrical contact between the first to third brushes 155–157 and the conductive portions 151a, 152a and the common pattern 154, respectively, can be guaranteed.

Figure 2:
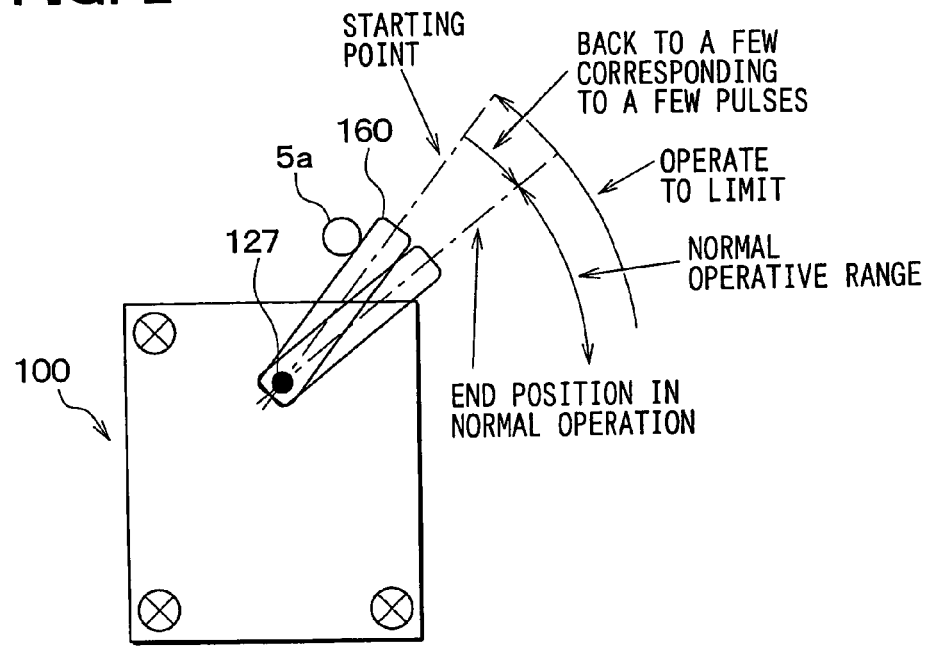
FIG. 2 is an outline view of an electrically-operated actuator in a first embodiment of the present invention.
Figure 3:
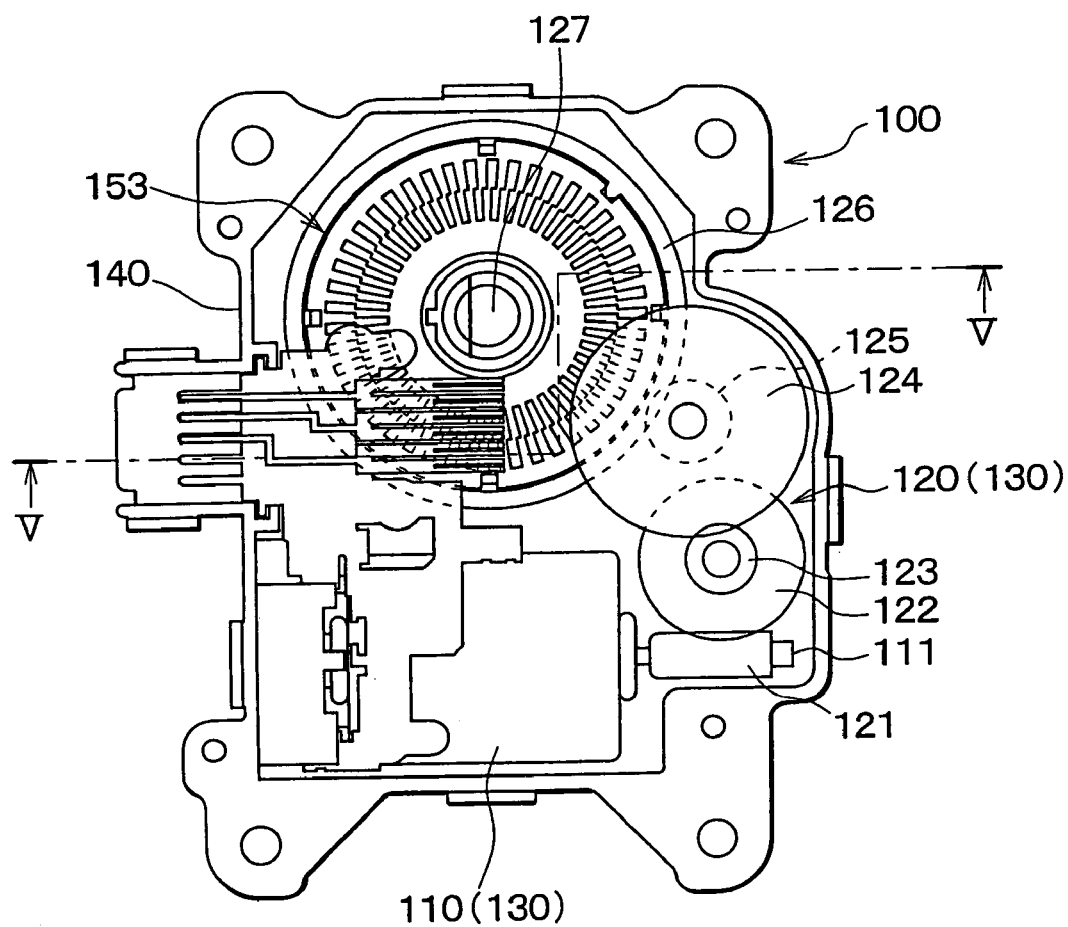
FIG. 3 is an inside view of the electrically-operated actuator in the first embodiment of the present invention.

As shown in FIG. 2, the output shaft 127 is provided with a link lever 160, which oscillates the air mix door 1, fixed by press-fitting, whereas the casing 5 is provided with a stop 5a to limit the motion of the link lever 160.

Figure 7:
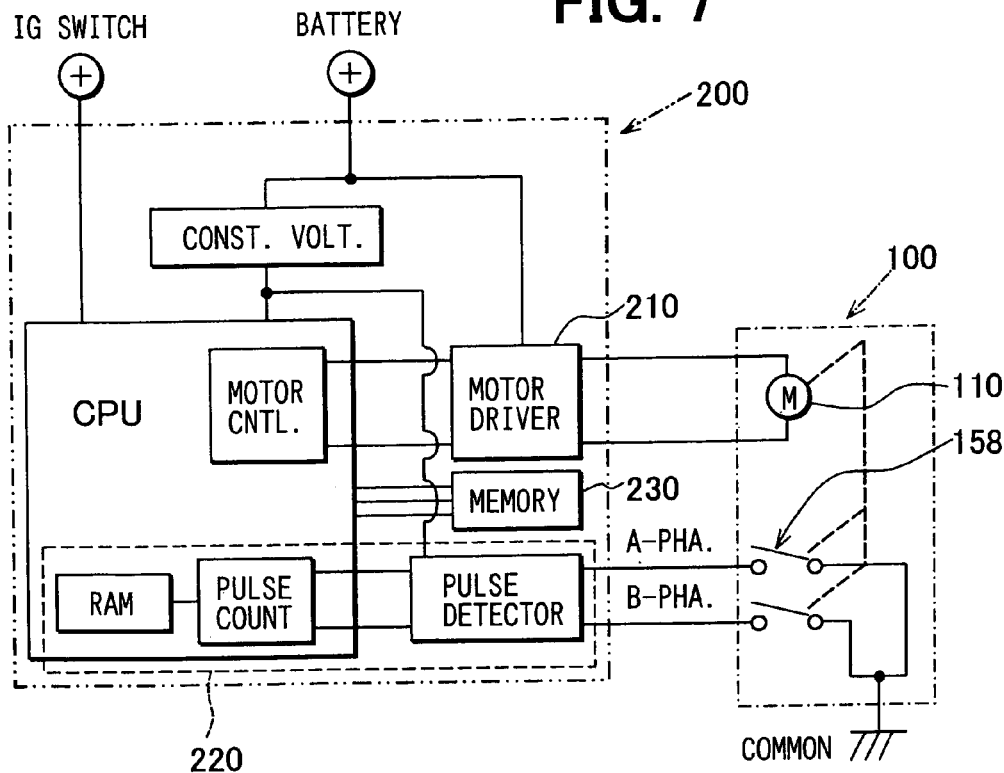
FIG. 7 is a circuit diagram of the electrically-operated actuator in the first embodiment of the present invention.

Next, a general operation of the actuator 100 will be described with reference to FIGS. 7 and 8. An electrical control circuit 200 of the actuator 100 is shown in FIG. 7 as motor control means. This circuit 200 includes a motor driving circuit 210 to drive the direct current motor 110, a rotation angle detection circuit 220 (rotation angle detecting means) for detecting a rotation angle and a rotating direction of the output shaft 127 in accordance with pulse signals generated at the pattern plate 153, and a memory circuit 230, such as an EEPROM, for memorizing various information, which is capable of keeping the information input therein even if an electric power supply is not provided.

A turning-on (ON) condition in which the first and second brushes 155, 156 contact the conductive portions 151a, 152a, respectively, and a turning-off (OFF) condition in which the first and second brushes 155, 156 contact the non-conductive portions 151b, 152b, respectively, occur alternatively and periodically when the output shaft 127, i.e., the pattern plate 153 rotates according to a rotation of the direct current motor 110.

Figure 8:
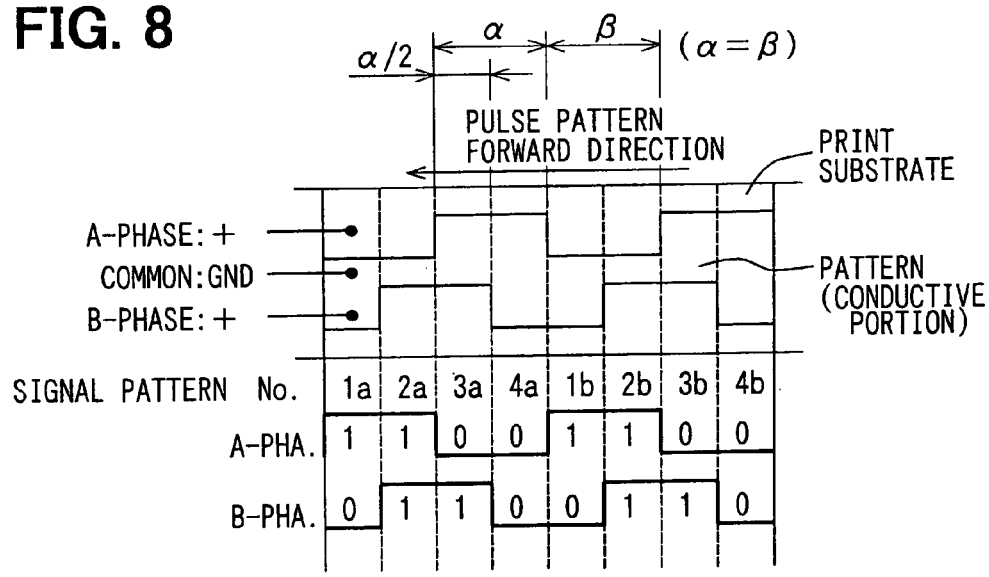
FIG. 8 is a timing chart for a pulse pattern of the electrically-operated actuator in the first embodiment of the present invention.

As a result, as shown in FIG. 8, pulse signals occur at the first and second brushes 155 and 156 every time when the direct current motor 110 rotates by a predetermined angle. A rotation angle of the output shaft 127 can be detected by counting the number of the pulse signals at the rotation angle detection circuit 220.

As understood from the above-description, the first and second brushes 155, 156 and the pattern plate 153 constitute a pulse generator (pulse generating means) 158 in this embodiment (see FIG. 7), which generates a pulse signal every time when the output shaft 127 rotates by a predetermined angle.

A phase of the first pulse pattern 151 is different from that of the second pulse pattern 152, so that two different pulse signals (shifted with each other) are generated. One is a pulse signal generated by the first pulse pattern 151 and the first brush 155 (hereinafter, referred to as an A-phase pulse), the other is a pulse signal generated by the second pulse pattern 152 and the second brush 156 (hereinafter, referred to as a B-phase pulse), which is sifted from the A-phase pulse.

Therefore, the rotating direction of the direct current motor 110 can be detected by determining which pulse signal is input first, the A-phase or B-phase.

To control the number of rotations of the motor 110, i.e., the number of rotations of the output shaft 127, a position at which the rotation of the motor 110 is mechanically limited by contact between the link lever 160 and the stop 5a is memorized as a starting point at first, then, the motor 110 is controlled by using a location away from the starting point by a distance corresponding to two pulses as an operative initial point, except a situation where the battery is disconnected or a situation where an abnormality occurs in the pulse signal.

Hereinafter, a process, for memorizing the position at which the rotation of the motor 110 is mechanically stopped by contact between the link lever 160 and the stop 5a as the starting point, and for setting the operative initial point away from the starting point, is referred to as an initial position setting process. When the change in a pulse signal stops, it is regarded as the position where the link lever 160 contacts the stop 5a.

Next, a flow for controlling the direct current motor 110 will be described with reference to FIGS. 9 and 10.

In a situation where an ignition switch (IG switch) of the vehicle is turned on, it is determined whether the ignition switch is turned on for the first time after the battery is connected in accordance with a flag memorized in the memory circuit 230 (S110). If the ignition switch is turned on for the first time after the battery is connected, the initial position setting process is conducted (S120). Then, the direct current motor 110 is controlled according to steps S130–S220 after the determination of ignition switch being turned on, so that an opening degree of the air mix door 1 is set at a target position (target rotating angle). Here, the ignition switch is a permission switch to permit the start for supplying the electrical power to the direct current motor 110.

On the other hand, in a situation where the ignition switch is turned on, but it is not the first time it is turned on after the battery is connected, it is determined whether a battery-off determination flag (battery-off determination bit) is on or not, which is memorized in the memory circuit 230 to inform of a situation where the battery is connected (S230).

When the battery-off determination flag is not on, the direct current motor is controlled so that the opening degree of the air mix door is set at the target position (S130–S220) after the initial position setting process is performed (S120). When the battery-off determination flag is on, the direct current motor is controlled so that the opening degree of the air mix door 1 is set at the target position (S130–S220) after the battery-off determination flag is erased by setting the bit as "0" value (S240).

While the direct current motor is controlled so that the opening degree of the air mix door 1 is set at the target position (S130–S220), that is, while the electric power is supplied to activate the direct current motor 110, if a situation where the change in a pulse signal stop occurs (S170), and the situation is being continued after a predetermined time has passed (S200) in a condition where the current is supplied to activate the motor, because of the high possibility where an abnormality of a pulse signal might occur, it is determined that the abnormality occurred in the pulse signal. Then, the activation of the actuator 100 is stopped by stopping the electric power supply thereto (S210), and the information indicative of the condition where the change in the pulse signal stop is memorized in the memory circuit 230 (S220).

While the electric power is supplied to the motor 110 and the change in the pulse signal continue, it is determined whether the pulse signals are regularly generated or not (see FIG. 8), that is, whether a pulse skip or the like occurs or not (S180). When the pulse skip is not caused, the flow will return to step S130 to continue the regular procedure in which the direct current motor is controlled so that the opening degree of the air mix door 1 is set at the target position. Meanwhile, when it is determined that the pulse skip was caused, the flow will return to step S130 to continue the regular procedure described above after the information indicative of the condition where the pulse skip occurred is memorized in the memory circuit 230 (S190).

In this situation, there is a high possibility that an actual opening degree of the air mix door 1 might be different from the target position since the direct current motor 110 is still controlled despite the existence of the pulse skip or the like.

Therefore, the initial position setting process will be performed after the ignition switch is turned off as described below.

Figure 9:
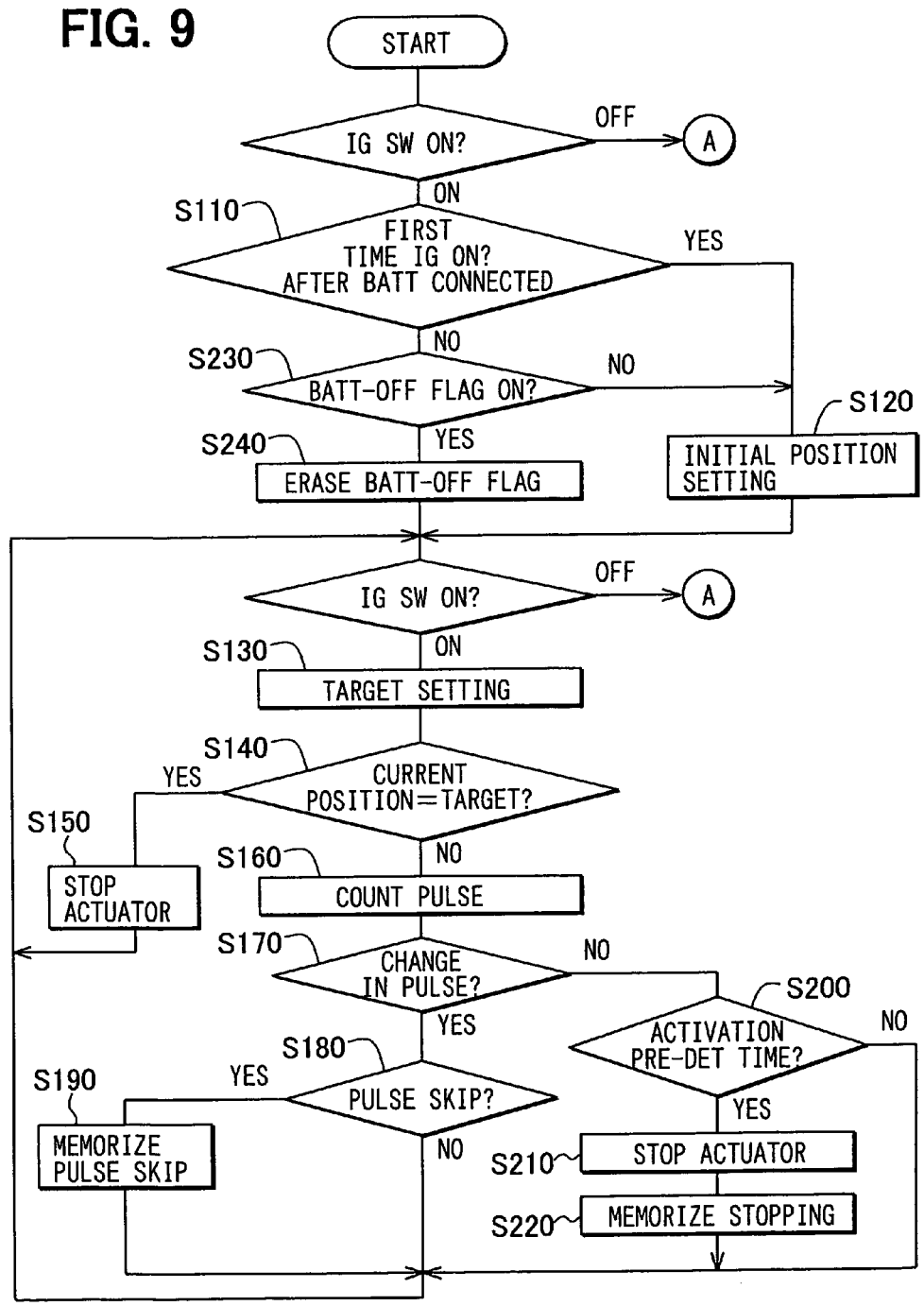
FIG. 9 is a flow chart for a control of the electrically-operated actuator in the first embodiment of the present invention.
Figure 10:
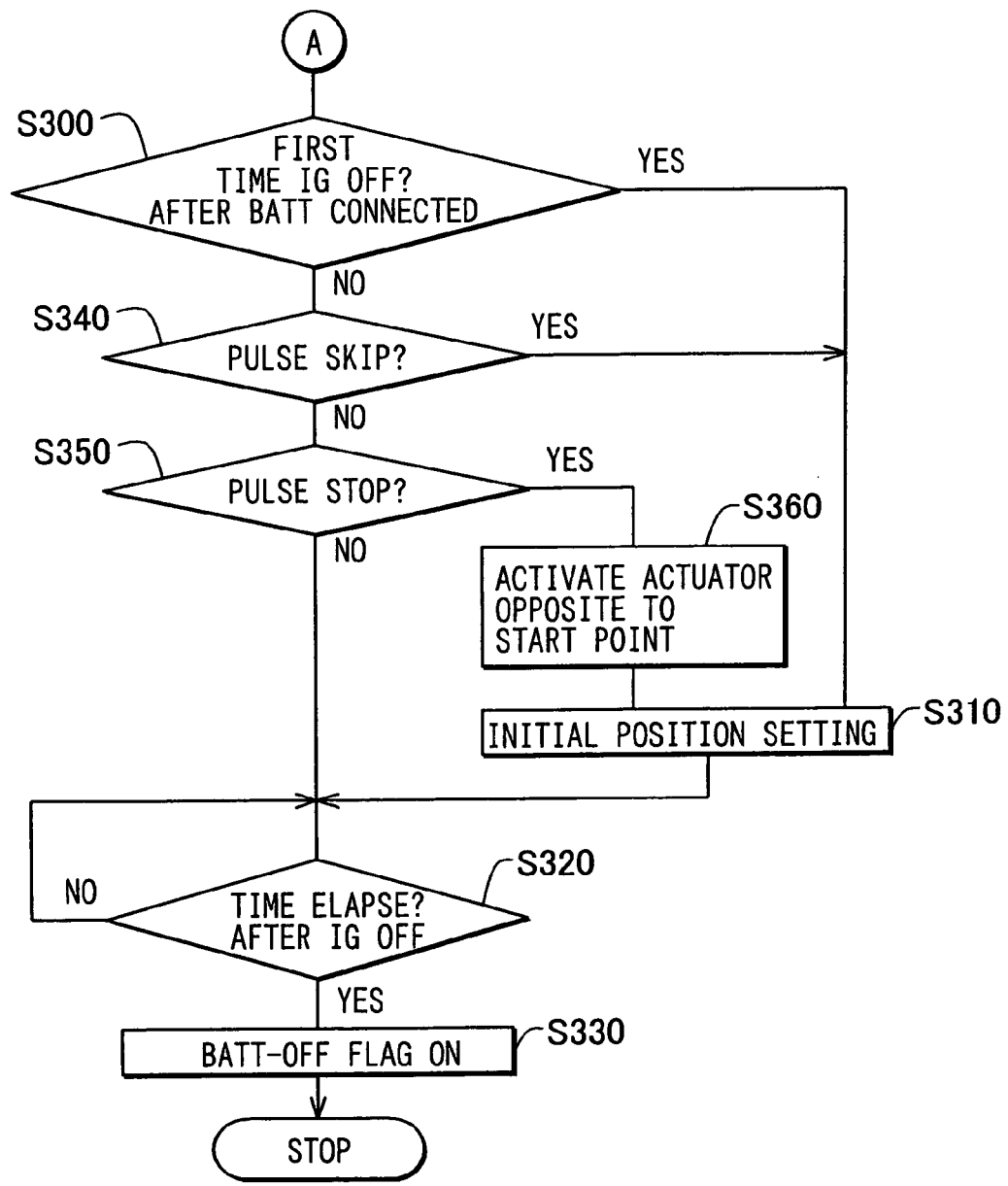
FIG. 10 is a flow chart for a control of the electrically-operated actuator in the first embodiment of the present invention.

When it is determined the ignition switch is turned off at the first step in FIG. 9, the flow will continue to the procedure shown in FIG. 10. When the ignition switch is turned off for the first time after the battery was connected, the initial position setting process is performed (S300, S310). After the predetermined time has passed since the ignition switch was turned off (S320), the battery-off determination flag is turned to be on in the memory circuit 230 (S330).

The duration of the predetermined time is shorter than a period of the time for stopping the electric power supply from the battery to the electrical components provided in the vehicle to reduce the consumption of the dark current. The condition where the battery-off determination flag is on represents a situation where the battery is connected to the vehicle. The condition where the battery-off flag is not on represents a situation where the battery is disconnected from the vehicle.

At step S300, on the other hand, when it is not determined that the ignition switch is turned off for the first time after the battery was connected, then, it is determined whether the pulse skip occurred or not based on the information stored in the memory circuit 230 (S340). When it is determined that the pulse skip occurred while the direct current motor 110 was activated, the initial position setting process is performed (S310), and then, the battery-off determination flag is stored in the memory circuit 230 after the predetermined time has passed since the ignition switch was turned off (S320, S330).

When it is determined that the pulse skip did not occur, it is determined whether the pulse signal has stopped or not in accordance with the information stored in the memory circuit 230 (S350). When it is determined that the pulse has stopped, the activation current is applied to rotate the direct current motor 110 to a direction opposite to a rotating direction in which the motor 110 was activated just before it was stopped. Then, the initial position setting process is performed (S360, S310).

In this embodiment, the activation current described above is for rotating the direct current motor 110 to a direction opposite to the direction of the starting point.

In this embodiment, the number of times for performing the initial position setting is substantially reduced, since the initial position setting is performed only when the necessity to conduct it is high, that is, in the situation where the abnormality, such as the stop of pulse signals or the pulse skip, occurs in the pulse signal. Therefore, it would be helpful for a designer or a user. For example, the size of the actuator 100 or the stop 5a might not need to be as large. Or, the increase of the manufacturing costs might not be increased.

The initial position setting is also performed when an event, such as the pulse skip, which influences the accuracy in control, occurs. Therefore, the accuracy in control can be maintained while the size of the actuator 100 or the stop 5a might not need to be as large, and/or, the increase of the manufacturing costs might not be increased.

Also, the initial position setting is performed after it is determined that the battery was disconnected or not, based on the battery-off determination flag. This process results in the reduction of the number of times for performing the initial position setting process, which might be unnecessary. Therefore, the size of the actuator 100 or the stop 5a might not need to be as large, and/or, the increase for the manufacturing costs might not be increased.

When the stop of the pulse occurs, the initial position setting is performed after the activation current is applied for rotating the direct current motor 110 to a direction opposite to a rotating direction in which the motor 110 was activated just before it has stopped. Therefore, the motor-locking phenomenon caused by a foreign object being jammed could be cleared spontaneously, so that the reliability and durability of the actuator 100 can be improved.

It can be determined correctly whether or not the abnormality occurs in the pulse signal, even if a suspected stop of the change in the pulse signal occurs, or the output level of the pulse signal is lowered in a situation where the voltage for the activation current is not enough, or in a situation where the amount of load is large. Because the determination of whether or not the abnormality occurs in the pulse signal, in other words, the determination of whether or not the change in pulse signal stops is conducted after the predetermined time has elapsed since the activation current was supplied.

(Second Embodiment)

Figure 11:
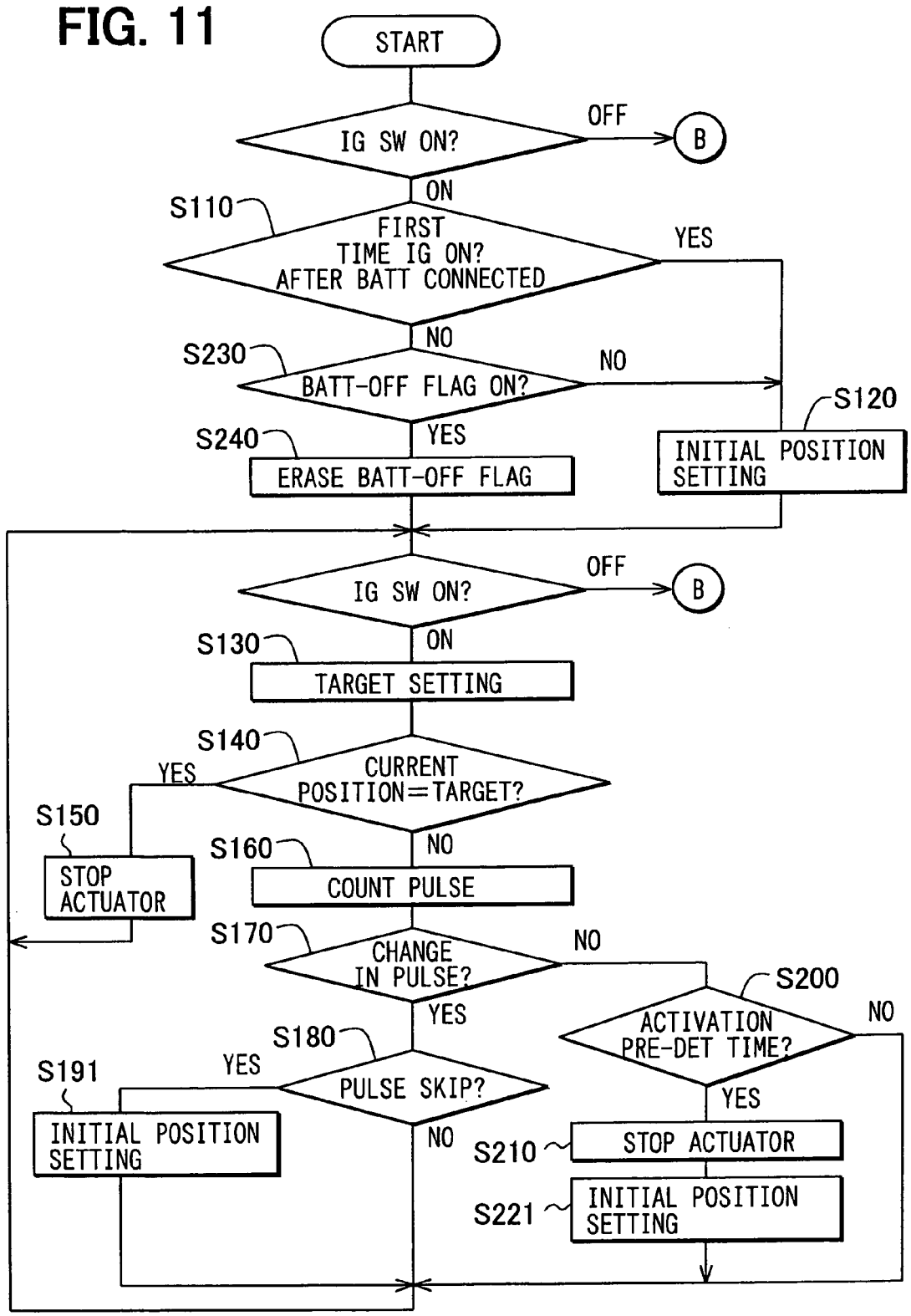
FIG. 11 a flow chart for a control of the electrically-operated actuator in a second embodiment of the present invention.
Figure 12:
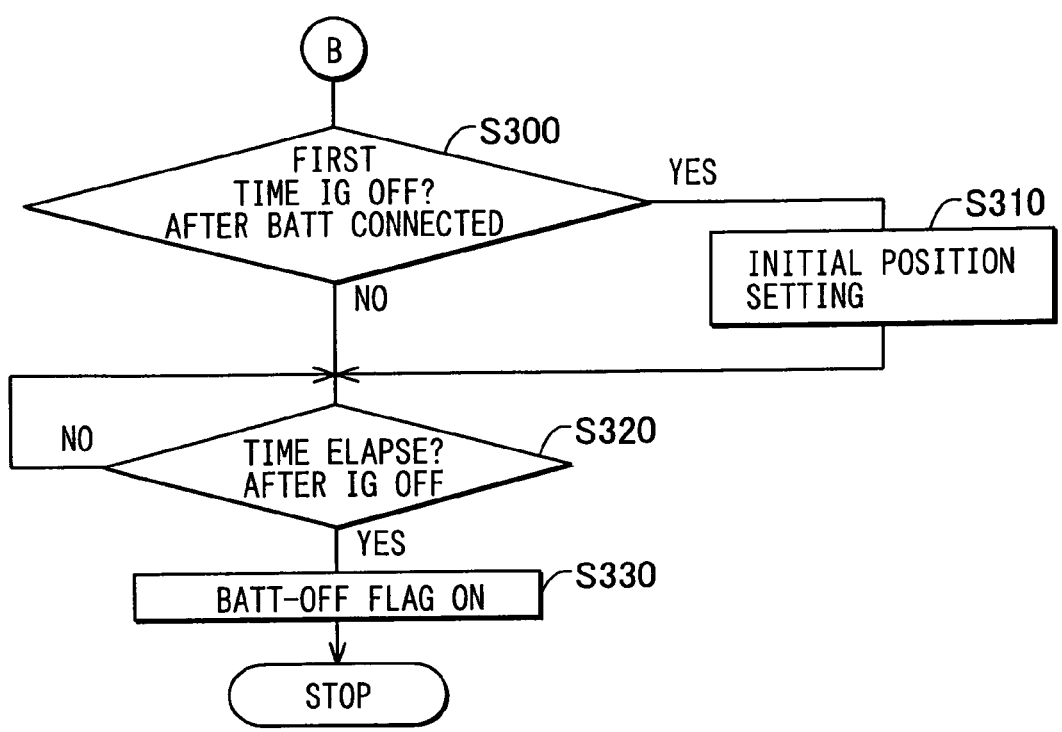
FIG. 12 a flow chart for a control of the electrically-operated actuator in the second embodiment of the present invention.
Figure 13:
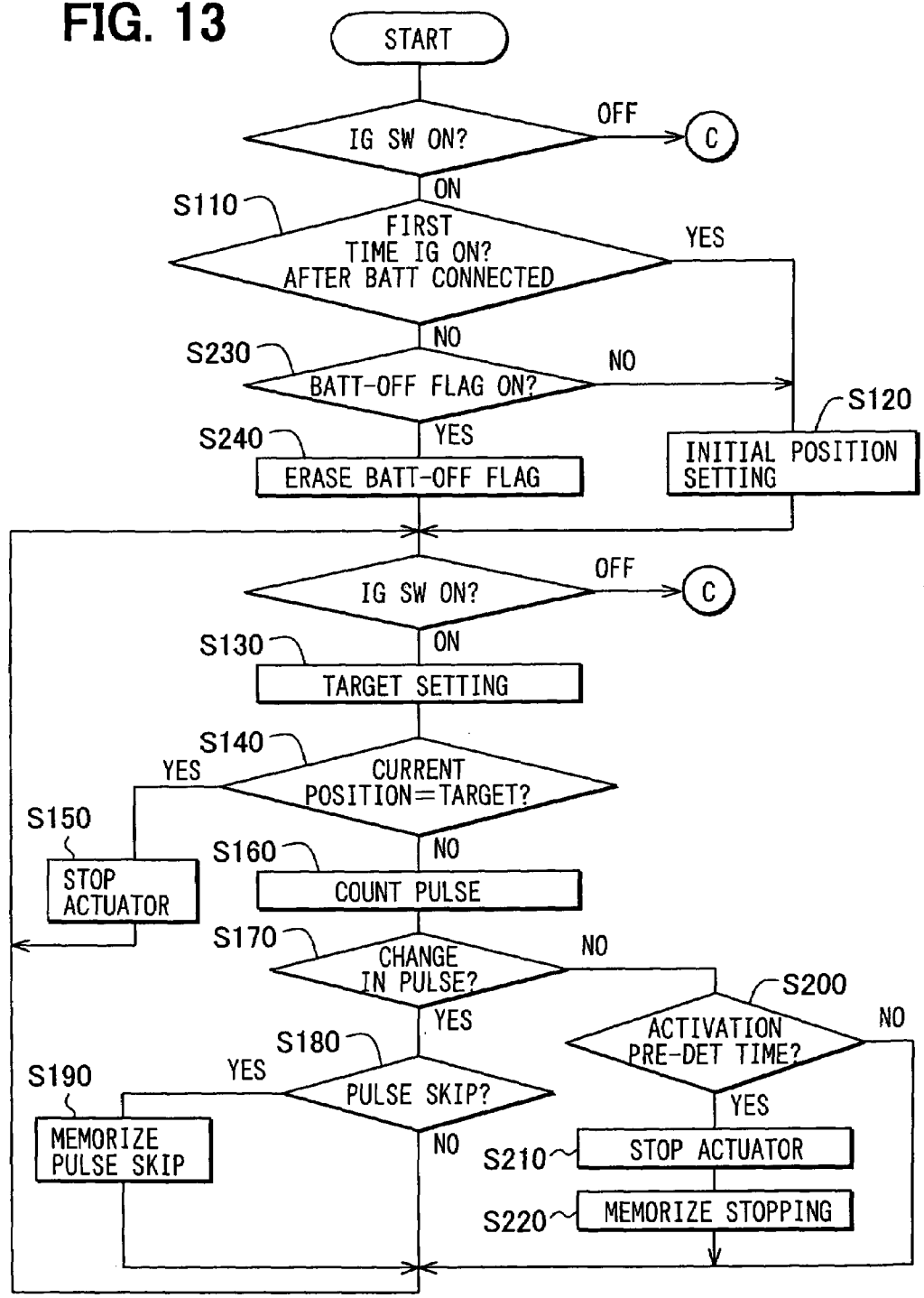
FIG. 13 a flow chart for a control of the electrically-operated actuator in a third embodiment of the present invention.
Figure 14:
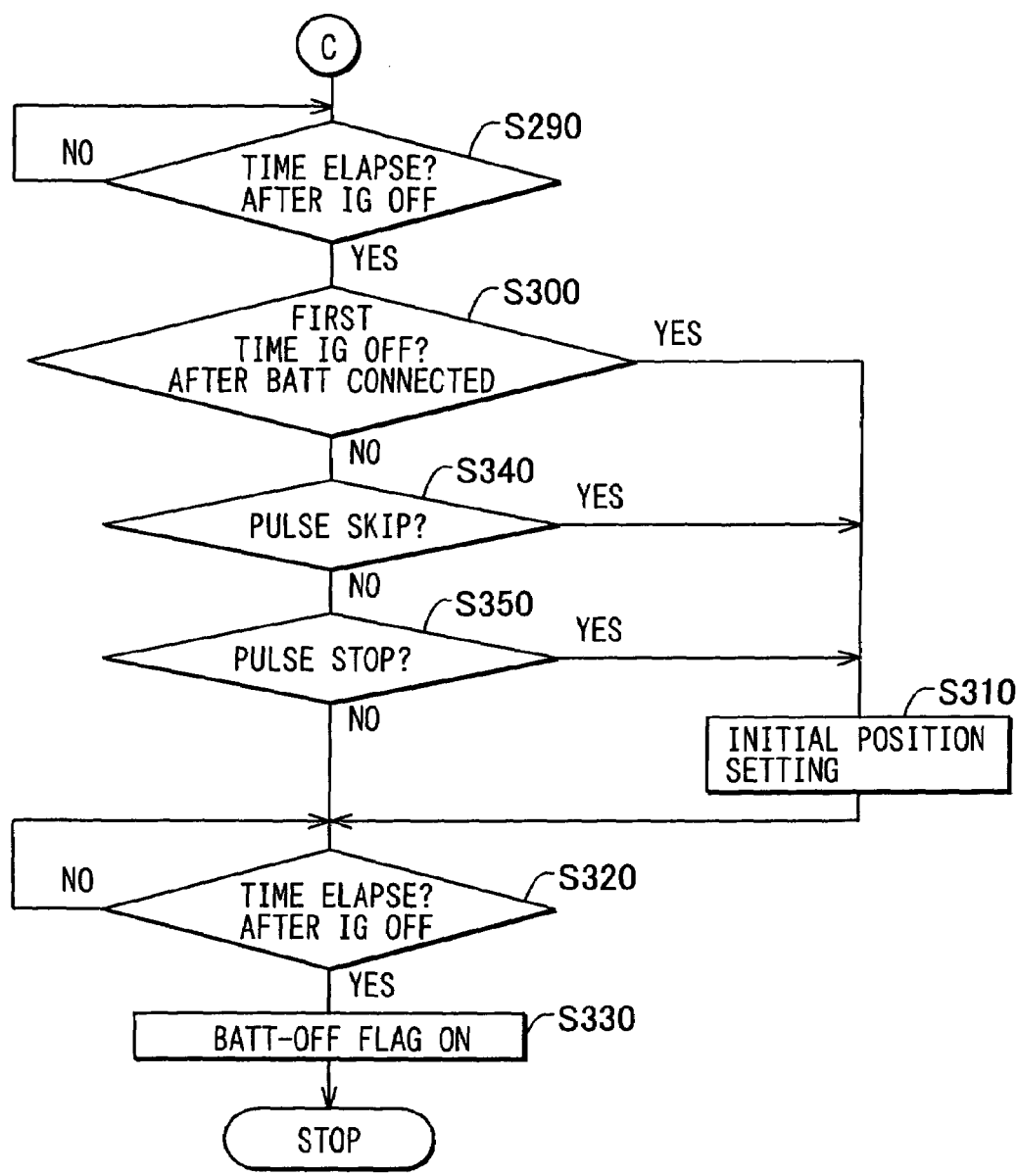
FIG. 14 a flow chart for a control of the electrically-operated actuator in the third embodiment of the present invention.
Figure 15:
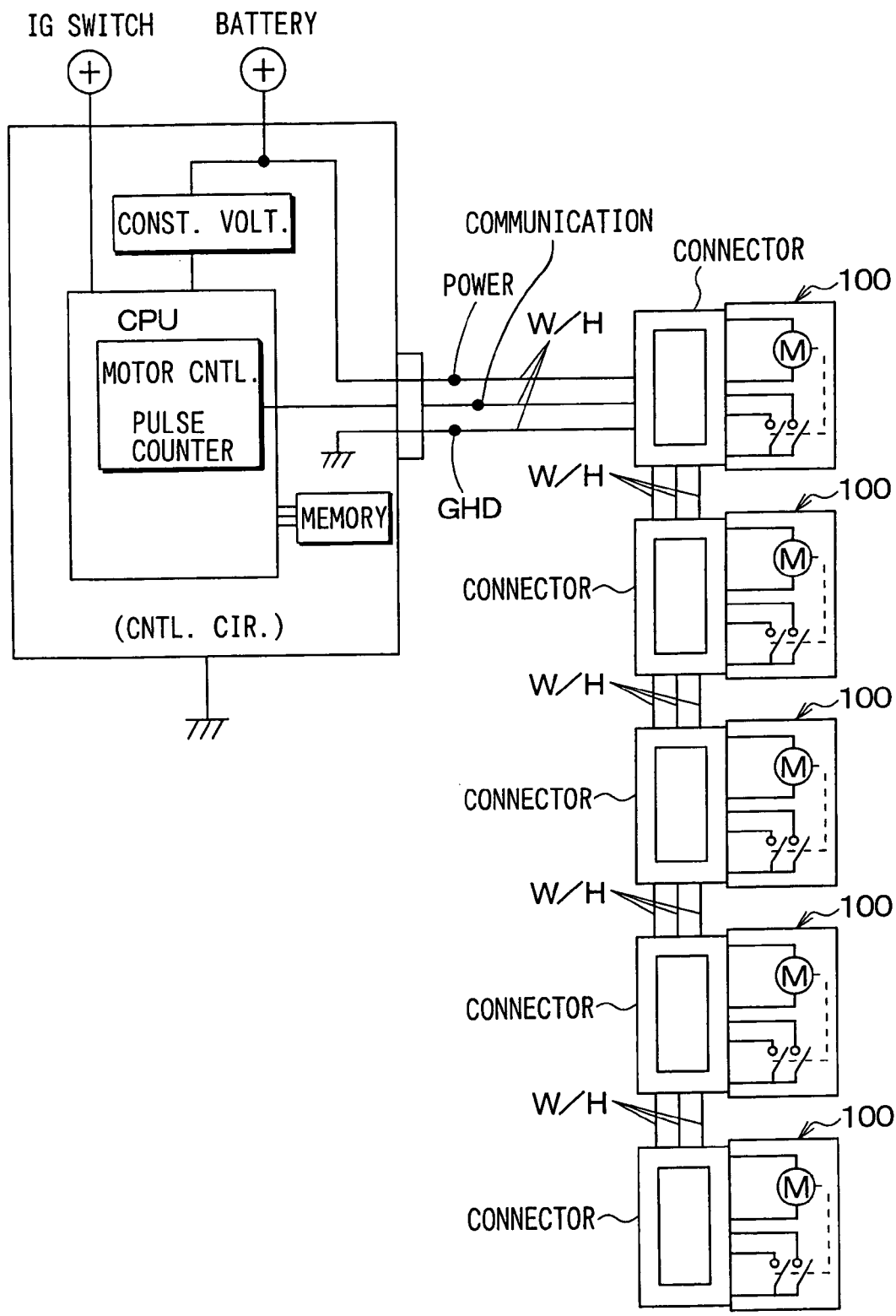
FIG. 15 a circuit diagram of electrically-operated actuators in a fourth embodiment of the present invention.

In the first embodiment, the initial position setting is performed based on the information, which denotes that the pulse stops or the pulse skip occurs and was stored in the memory circuit 230, and it is performed after the ignition switch is turned off. On the other hand, the initial position setting is performed immediately after the pulse stops or the pulse skip occurs (S191, S221) as shown in FIGS. 11 and 12 in this embodiment.

Therefore, the initial position can be reset at an early stage.

After the ignition switch is turned off, the initial position setting process is performed only when it is turned off for the first time after the battery is connected.

(Third Embodiment)

In this embodiment, the abnormality such as the stop of pulse or the pulse skip is memorized in the memory circuit 230 at step S190, or S220 when it occurs. Then, the initial position setting process is performed when the predetermined time has elapsed after the ignition switch is turned off.

More specifically, step S290 for determining whether the predetermined time has elapsed after the ignition switch is turned off is provided before step S300.

With this feature, the initial position could be reset without a sense of incongruity occurring in a user by its operating noise or the like.

(Fourth Embodiment)

In this embodiment, plural actuators 100a–100e and a control device are connected to each other in a network by data communication to reduce the number of connecting wires.

In the communication line, data signal for controlling each actuator and pulse data regarding the number of pulses are transferred between a CPU and each actuator according to procedures determined by a predetermined protocol. Each actuator 100 can be activated by the data signal transferred through the communication line.

In the embodiments described above, the position where the rotation of the direct current motor 110 is mechanically stopped by stopping the link lever 160 at the stop 5a is referred to, and memorized as the starting point. Then, the direct current motor 110 is controlled by using the position away from the starting point as the operative initial point. However, the starting point can also be referred to as the operative initial point.

In the above-described embodiments, sleeve contact is used as the position detecting method. However, other types of detection of the position, such as an optical encoder or the like, can be adapted.

Although the pulse generator 158 is provided at the output shaft 127 in the above-described embodiments, a reduced-speed rotating portion may be provided for the pulse generator 158 (pulse plate 153) to generate the pulse signals.

The common pattern 154 can be disposed on an outside of the pulse patterns 151, 152, or can be disposed therebetween.

The actuator and method for controlling the actuator can also be adapted not only to the vehicle air ventilation system but other devices.

While the present invention has been shown and described with reference to the foregoing preferred embodiment, it will be apparent to those skilled in the art that changes in form and detail may be therein without departing from the scope of the invention as defined in the appended claims.

What is claimed is:

1. An electrically-operated actuator system comprising:
an electrically-operated motor rotating by being supplied with current from a power source;
a rotation angle detector for detecting a rotation angle of said motor in association with a signal which relates to said rotation angle;
an initial position setting portion for setting an initial position of said motor based on a starting point memorized therein; and
an initial position resetting portion for activating said initial position setting portion in a situation where an abnormality occurs in said signal or where said power source is electrically disconnected.

2. An electrically-operated actuator system according to claim 1, wherein said starting point is a position where a movement of said motor is mechanically stopped, and said initial position is away from said starting point.

3. An electrically-operated actuator system according to claim 1, wherein said initial position resetting portion determines that said abnormality occurs in said signal when distortion occurs in a waveform of said signal.

4. An electrically-operated actuator system according to claim 3, wherein said initial position resetting portion determines that said abnormality occurs in said signal when change in said signal stops while said current is applied from said power source to said motor.

5. An electrically-operated actuator system according to claim 3, wherein said initial position resetting portion determines whether said abnormality occurs in said signal after a predetermined time has elapsed since the current from the power source is supplied to said motor.

6. An electrically-operated actuator system according to claim 3, wherein said initial position resetting portion activates said initial position setting portion after supplying enabling current to said motor so that the motor rotates in a direction opposite to a direction in which said motor had rotated just before being stopped.

7. An electrically-operated actuator system according to claim 3, wherein said initial position resetting portion activates said initial position setting portion after supplying enabling current to said motor so that the motor rotates in a direction opposite to a direction toward said starting point.

8. An electrically-operated actuator system according to claim 1, wherein said initial position resetting portion activates said initial position setting portion when a predetermined time has elapsed after a starting switch for providing electric power to said motor is turned off in a case where the abnormality occurs in said signal that is memorized in a memory.

9. An electrically-operated actuator system according to claim 1, wherein said initial position resetting portion activates said initial position setting portion immediately after a starting switch for providing electric power to said motor is turned off in a case where the abnormality occurs in said signal that is memorized in a memory.

10. An electrically-operated actuator system according to claim 1, wherein said initial position resetting portion activates said initial position setting portion immediately after said abnormality occurs in said signal.

11. An electrically-operated actuator system according to claim 1, wherein said power source is a battery and the electrically-operated actuator system further includes:
   a start switch for providing electric power from said battery to said motor; and
   a memory device for memorizing information input therein, and capable of keeping said information without electrical power being supplied from said battery, wherein
said initial position resetting portion includes:
battery information writing means for inputting information denoting said battery is electrically connected after said start switch is turned off, and
activation means for activating said initial position setting portion when said information is not kept in said memory device after said start switch is turned on.

12. An electrically-operated actuator system according to claim 11, wherein said memory device is an EEPROM capable of being rewritten by an electrical procedure.

13. An electrically-operated actuator system according to claim 11, further including:
   means for initializing said information input therein after said start switch is turned on.

* * * * *